United States Patent [19]

Burger

[11] Patent Number: 5,641,527
[45] Date of Patent: Jun. 24, 1997

[54] PROCESS OF MAKING FILLED BOILED BAGEL PRODUCT

[76] Inventor: Alvin Burger, 7876 SW. 89th La., Miami, Fla. 33156

[21] Appl. No.: 577,963

[22] Filed: Dec. 26, 1995

Related U.S. Application Data

[63] Continuation-in-part of Ser. No. 106,763, Aug. 16, 1993, Pat. No. 5,514,395, which is a continuation-in-part of Ser. No. 816,010, Dec. 31, 1991, Pat. No. 5,236,724.

[51] Int. Cl.$^6$ .................................................. A21D 13/00
[52] U.S. Cl. ...................... 426/94; 426/19; 426/62; 426/283; 426/499; 426/502; 426/549
[58] Field of Search ...................... 426/94, 19, 21, 426/549, 499, 275, 504, 61, 62, 89, 282, 283, 284, 502

[56] References Cited

U.S. PATENT DOCUMENTS

| | | | |
|---|---|---|---|
| 5,236,724 | 8/1993 | Burger | 426/94 |
| 5,346,715 | 9/1994 | Fertel | 426/499 |
| 5,514,395 | 5/1996 | Burger | 426/94 |

*Primary Examiner*—Lien Tran
*Attorney, Agent, or Firm*—Stein, Pendorf & Van Der Wall

[57] ABSTRACT

A process of making a filled bagel dough product and the product formed thereby. One process comprises the steps of mixing and kneading a quantity of bagel dough, including yeast; sealing a filler such as cream cheese within a bagel dough shell; pressing against the product to deform the product, either with or without penetration of the bagel dough shell, to thereby form the product into a semi-toroid, toroid, or platelet shape; proofing the product; optionally freezing the proofed product; boiling the frozen product, and browning the boiled product. Thereafter the product may be consumed or refrozen. The process is preferably used to produce a novel relatively large (half pound) platelet shaped filled bagel dough product with a distinctive New York bagel dough taste, with a fresh tasting cream cheese filler included inside the shell, and with toppings optionally provided on the upper surface.

22 Claims, 10 Drawing Sheets

PROCESS OF MAKING FILLED BOILED BAGEL PRODUCT

This application is a continuation-in-part of application Ser. No. 08/106,763 filed Aug. 16, 1993 now U.S. Pat. No. 5,514,395, entitled "Filled Bagel Dough Product and Method", which was a continuation-in-part of application Ser. No. 07/816,010 filed Dec. 31, 1991, entitled "Filled Bagel Dough Product and Method", which issued as U.S. Pat. No. 5,236,724.

BACKGROUND OF THE INVENTION

1. Field of the Invention

The present invention relates to a unique food product comprising a bagel shell with materials conventionally used as bagel toppings, such as natural or imitation cream, enclosed within the shell. The product provides enjoyment of the distinctive New York bagel, characterized by a tough crust and chewy crumb, including cream cheese, with no requirement for cutting or spreading cheese. It has surprisingly been found that freezing a proofed filled bagel dough product followed by boiling the dough product while still frozen produces a New York style cream cheese filled bagel dough product with a fresh tasting cream cheese filler. The cream cheese, following freezing and boiling, is substantially the same as if it had never been frozen. The invention further relates to methods for the production of the filled bagel product.

2. Discussion of the Related Art

Bagels are a toroidally shaped bakery product having a hard outer crust and soft inner crumb portion which combine to provide a distinctive "bagel" taste and feel. Preferred among bagels is what is referred to as a New York bagel, a bagel with a hard outer crust and a chewy inner crumb. Traditionally, the dough is worked on a flour board and set in a warm place to rise, then kneaded again before being formed into rings. The rings are formed from balls of risen dough, either by poking a hole through the center of each ball or by rolling each ball into a long strip, shaping the strip into a ring, and then pressing the ends together.

An important step in the traditional bagel making process is boiling the yeast dough in water in order to close the pores of the dough to form a skin. Boiling is then followed by baking in a hot oven to turn the crust golden brown.

A favorite way of enjoying bagels is to slice them in half, and spread a topping, such as cream cheese, on the cut surfaces. Bagels are characteristically cut open by slicing them across their width on a plane perpendicular to the axis of the toroid, and spreading the topping on them. Because of the hard crust, the cutting process requires a sharp knife which can be hazardous. Further, due to the soft crumb interior, a slightly dull knife will crush the hard crust into the soft crumb interior, compacting the interior, which detracts from appearance and taste. Moreover, such planar cutting is typically awkward and does not result in two planar halves. Spreading the cream cheese on the bagel may also be tedious as the cream cheese is stored in a refrigerator and is very viscous until it warms.

It is known to include certain flavorings or fillers on or in bagel dough, such as unions, poppy seeds, salt, or raisins. These are materials which have substantially the same handling characteristics as bagel dough: they can withstand the heat of cooking, and are relatively stable at room temperature for extended periods of time. These materials are not what one would consider a "topping".

Although bagels and cream cheese go together during consumption, bagels and cream cheese are very different chemically, and have different storage and handling requirements. Cream cheese is perishable, thermally sensitive, and easily contaminated, and is thus conventionally maintained in a chilled state until use. Cream cheese can not simply be frozen and thawed without experiencing separation of solids and liquids, nor can it be left exposed to air at room temperature for extended periods, nor can it be subject to the high temperatures at which bagel dough is cooked. Thus, for reasons of product preparation as well as for reasons of food storage and handling, it would be counter-intuitive to incorporate cream cheese in a bagel dough.

U.S. Pat. No. 5,236,724 entitled "Filled Bagel Dough Product and Method" which issued to the present inventor was first to describe a technique by which cream cheese could actually be incorporated into a bagel dough shell. However, the filled bagel dough product is disclosed as being in the shape of a ball. A ball-shaped product has inherent limitations, both in the cooking process and in the consumption process. A bagel dough ball product, while having advantages of being compact, relatively stable at room temperature, and easy to handle, is necessarily limited in size, since a large cream cheese filled bagel ball can not be eaten by a consumer. Further, a sphere has a minimal outer surface area and a dome shaped upper surface area. These two factors make it rather difficult to provide toppings on the bagel ball.

While there is no suggestion for the production of a filled bagel product in a shape other than a ball, the present inventor undertook to modify the shape, and discovered that there are significant problems with the handing of a raw bagel dough article filled with cream cheese. These problems included the problem of stretching the bagel dough shell until the shell was too thin or ruptured, and the problem of joining a first bagel dough surface to a second bagel dough surface after one or both surfaces had been contacted by cream cheese.

There is thus a need for a filled bagel dough product which represents an improvement over the bagel ball. There is also a need for methods for the production of such improved products.

SUMMARY OF THE INVENTION

It is an object of the present invention a cream cheese-filled bagel dough product which provides enjoyment of the distinctive bagel and cream cheese taste, with no requirement for cutting or spreading the cheese. It is a further object of the invention to provide a cream cheese-filled bagel dough product which can be stored for long periods of time in a freezer.

It is yet a further object of the invention to provide a bagel dough product which has the shape and feel of a conventional torroidal bagel, yet which is provided with a cream cheese filling.

It is yet a further object of the invention to provide a bagel product in a shape which has advantages over a bagel ball, and to methods for the automated production thereof.

Despite the apparent technical contradictions between the bagel preparation process and the cream cheese handling requirements, the present inventor discovered that a filled bagel dough product can be produced by a method comprising sealing a quantity of cream cheese within a quantity of bagel dough to form a shaped, filled bagel dough article (such as a toroid or a platelet), proofing the shaped product, and then (1) freezing the product for storage and subsequent consumption by boiling the frozen product for approximately 5 minutes, followed by browning the crust for about 1 minute, or (2) optionally chilling the proofed product to enhance stability of the cream cheese, then boiling the product for approximately 1 minute, followed by browning for up to about 6 minutes, with the product being ready for freezer storage either after boiling or after browning.

In the case of forming the torroidal bagel product, the filled shape can be produced by any suitable technique such as co-extrusion, forming by hand, forming a ball and either manually or mechanically transforming the filled ball into a filled torroid, or by laminating an upper hemispherical bagel shell to a cream cheese filled lower hemispherical bagel shell.

In the case of forming a platelet shaped product, the filled shape can be produced by any suitable technique such as forming a filled ball or other shape and compressing the shape, preferably to a greater extent centrally than peripherally, to form a platelet, or by a laminating process wherein cream cheese is deposited onto a lower bagel dough shell layer, superposing an upper bagel dough shell layer over the lower layer, and laminating the upper and lower bagel shell layers to hermetically seal cream cheese between the upper and lower layers, and if necessary, cutting or trimming the filled product to any desired pattern or shape.

The step of boiling and browning forms an external and an internal skin, sets the yeast, and forms a wet crust. That is, as the outer surface of the cheese inside the product gets hot it gives off steam which steams the inside wall of the bagel product.

Surprisingly, the product of the invention can be freezer stored, where traditional solid cream cheese could not be freezer stored because the uncooked cream cheese curdles. It has been found that the problem with freezing is actually a problem with thawing, and that the problem with thawing can be overcome by either boiling (and optionally browning) prior to freezing, or boiling the frozen product. This is all the more surprising, in that it had previously been believed that a proofed cream cheese filled bagel shell could not be boiled, since the water will mix with the crumb (outer skin of shell) to create a gummy appearance. Surprisingly, the texture of the cream cheese filler, following freezing, boiling, and browning, (or even boiling, browning, and freezing), is substantially the same as though the cream cheese had never been frozen. The bagel dough has the taste and mouth feel of a traditional New York style bagel.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other filled bread products for carrying out the same purposes of the present invention. It should also be realized by those skilled in the art that such equivalent structures do not depart from the spirit and scope of the invention as set forth in the appended claims.

DETAILED DESCRIPTION OF THE INVENTION

Figure 1:
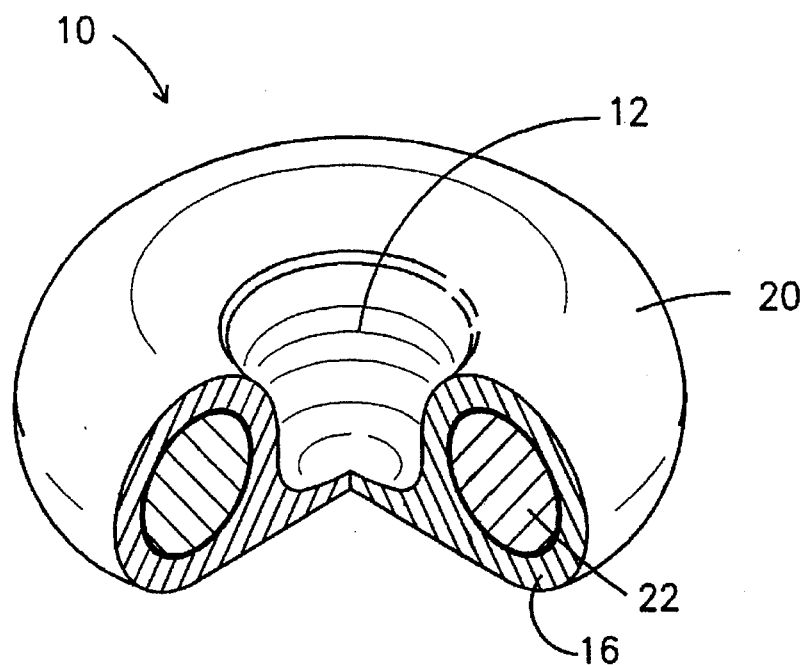
FIG. 1 is a partial cut-away perspective view of the filled bagel dough product.

This product and method is related to the subject of application Ser. No. 08/106,761 and U.S. Pat. No. 5,236,724, the subject matter of which are incorporated herein by reference. Beginning with this technology, upon further experimentation, it was discovered that the shape of the bagel dough product could be modified by taking certain precautions, and that the resulting filled bagel dough products had certain advantages including novel shape, ability to carry toppings, and ease of handling and eating. These advantages are added without any loss of texture or flavor of the product. Further, it was discovered that the bagel product could be produced by a unique boiling process which made it possible to produce a cream-cheese filled New York style bagel dough product.

The term "cream cheese", as used herein, is intended to refer to any product which can be incorporated in a bagel dough and which gives off sufficient steam in the steaming or baking step of the processes discussed below for forming a skin on the interior surface of the filled bagel dough product. For ease of description the term "cream cheese" is used in the specification, but it is understood that substitutes such as tofu, artificial or imitation cream cheese, marmalade, egg, etc. may be used in place of natural cream cheese.

Preparing Bagel Dough

Although the present invention is not limited to bagel dough, bagel dough is preferred and the invention will be illustrated with examples using bagel dough. The term "bagel dough" as used herein refers to a very turgid, high protein dough, such as known to make bagels using conventional bagel-making techniques. Such dough is similar to a lean french bread dough, being firm to the touch and easily rolled upon a floured surface. The dough is comprised of a mixture of flour, water, yeast, salt, and, sometimes, sugar. The flour should be a high gluten flour, such as a good clear spring wheat flour with protein content of typically 13.5–14% of flour weight. Water should be added in a quantity of Typically 50–53% of flour weight. Salt content should typically be 1.5–2.2% of flour weight. Yeast should be added in a quantity of typically 0.5–2% of flour weight. Sugar, which serves as a food for the yeast and not as a contributor to the final product, should be a dextrose, corn syrup, high fructose or other fermentable sugar, and can be added up to 4% of flour weight. Residual sugar, i.e., the presence of microscopic sugar on the outer surface of the bagel, contributes to the browning of the crust during baking.

Shaping the Product

In accordance with the invention, a filled bagel dough product may be produced by a process which may begin with a hollow spherical cup or other shape of stiff, high gluten yeast dough. The dough cup may be made by hand or machine. A quantity of cream cheese is deposited within the cup. The dough edges are brought up and over and sealed around the cream cheese to form a filled ball, the sealing being accomplished either by hand or by machine. Various ways of automatically filling a dough shell prior to cooking or baking are known. In a typical procedure, as exemplified by U.S. Pat. Nos. 4,334,464, 4,446,160 and 4,515,819 to Shinriki, a ball-shaped encrusted bakery product is automatically formed by depositing a ball of sticky edible paste material (e.g. jam) onto a starch film. Thereafter, a dough sheet is gathered around the ball to enclose it with dough before cooking. In U.S. Pat. No. 4,882,185 to Hayashi, a vertical tubular extrusion of bread dough crust material and jam or cream core material is cut and formed into two-layered balls without exposure of the core material. Other methods of production of filled dough products are described in U.S. Pat. Nos. 4,794,009 and 4,882,185.

The filled ball is then further shaped as discussed below.

In one embodiment of the invention the filled ball is centrally compressed so that the filler is pushed out of the center and into the torus, while the top and bottom of the shell are brought into contact such that the center is voided of filler and giving the product a semi-toroidal shape i.e., some dough may remain in the center of the torus, or the center may be punched out to give a more traditional bagel appearance).

U.S. Pat. No. 4,251,201 to Krysiak illustrates an apparatus for the preparation of a filled pretzel. Such filled shapes are also within the contemplation of the invention.

The preferred form of the filled bagel dough product of the present invention, shown in FIG. 1, is made according to the preferred process of the invention, described with FIGS. 2a through 4b. This process can be performed by hand, or can be performed in an automated fashion, using suitable machinery, such as extrusion and/or lamination machinery.

As shown in FIG. 1, the filled bagel dough product 10 is semi-toroidally shaped or platelet shaped, having an indentation 12 on one side and a flat plane on the other. The ultimate product 10 is a boiled and browned bagel having an outer crust 20 and an inner crumb 16 which surrounds a toroidal shape of a filler preferably including cream cheese 22.

Figure 2A:
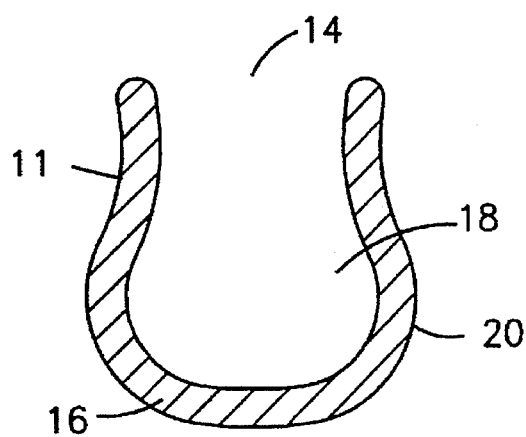
FIG. 2a is a side view of the open-ended hollow bagel dough ball before insertion of the filling.

As shown in FIG. 2a, after the bagel dough is mixed and kneaded to develop the gluten, it is shaped into a cup 11, open on one end 14, exposing a hollow 18. The round ball 11 may be about the size of a nickel prior to proofing. Such a starting product will form a food product approximately the size of a golf ball following proofing. The size of the food product may vary depending upon intended use. In one form, the final food product may be the size of popcorn, and may be consumed in a single bite. In the case that the food product has the mass of a golf ball, two or more bites may be sufficient to ingest the food product. The food product may also be rather large, such as ½ to 1 lb., in which case a single food product may serve as a meal, and may be sliced in the manner of a pizza prior to consumption.

Figure 2B:
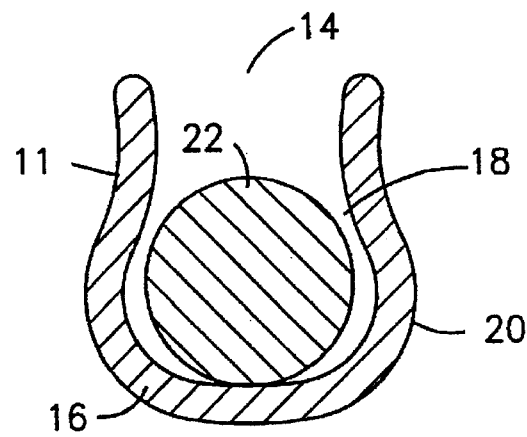
FIG. 2b is a side view of the open-ended hollow bagel dough ball with the cream cheese filling placed within the hollow.
Figure 4:
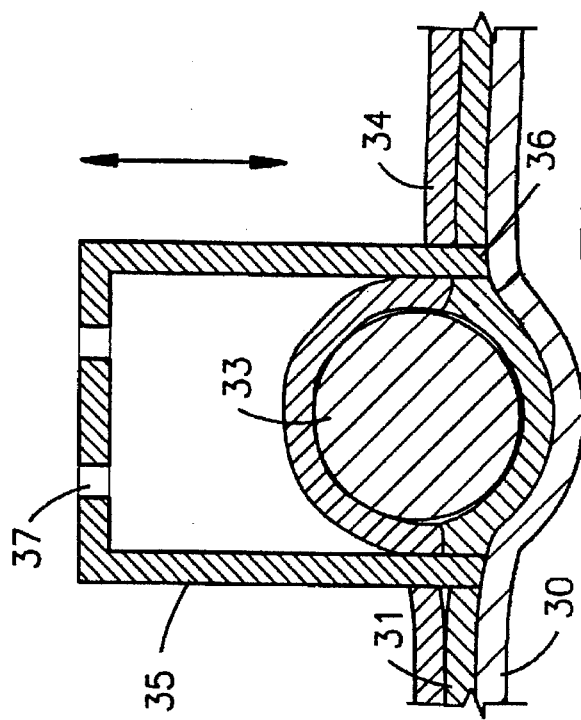
FIG. 4 shows a lower hemisphere and upper hemisphere prior to mating.
Figure 10A:
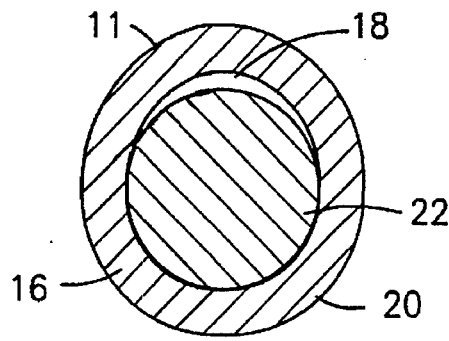
FIG. 10a shows a filled bagel ball prior to deformation.
Figure 10B:
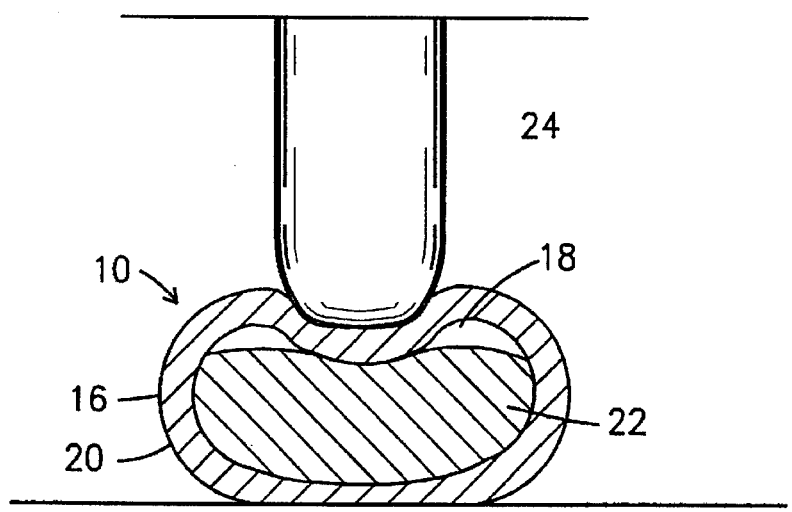
FIG. 10b shows a filled bagel ball during the process of deformation with a blunt projection.

As illustrated in FIG. 2b, a scoop of cream cheese 22, such as PHILADELPHIA BRAND (TM) at about 40°–60° F. is inserted into the hollow 18 through the open end 14. The open end 14 is then closed to hermetically seal the cream cheese 22 within the dough ball 11 as shown in FIGS. 10a.

In an automated batch process for production of filled bagel products, the bagel ball preshapes may be formed by an automated process as follows. The bagel dough is mixed and kneaded in a conventional manner. The dough is formed into sheets and is either chemically or mechanically relaxed in a conventional manner. One sheet of dough is then conveyed to a lower mold half 30 which has at least one concave lower half of a sphere defined therein. In a preferred embodiment, the lower mold half 30 has rows and columns of depressions or concavities defined therein, preferably about 6 rows and 8 columns for the simultaneous production of 48 bagel ball lower halves and, ultimately, 48 bagel balls.

Figure 3A:
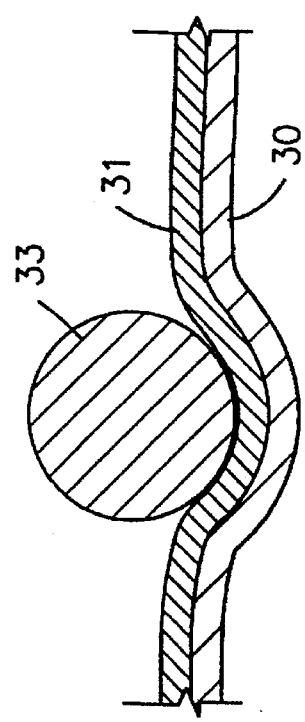
FIG. 3a is a transverse section of a solid dough ball in a mold prior to shaping.
Figure 3B:
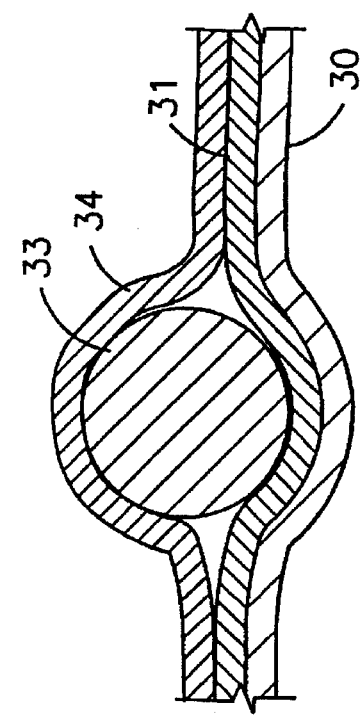
FIG. 3b is a transverse section showing a dough ball being shaped into a lower hemisphere.

As illustrated in FIG. 3a, the lower sheet of dough 31 settles into a gently curved lower hemispherical concave receptacle 30, and a quantity of cream cheese in the form of a ball 33 is deposited on the lower sheet within the depression. An upper sheet of relaxed bagel dough 34 is loosely overlaid over the lower sheet and filler. As is apparent from FIG. 3b, the gentle curvature of the lower receptacle 30 makes it possible to use the same lower receptacle for different sizes or amounts of filler.

Next, cylindrical shaped cutter 35 is brought down into lower receptacle 30 such that the lower rim 36 of the cutter slices through the two layers of bagel dough 31, 34 and contacts the receptacle 30. As the cutter 35 cuts through the dough it is also laminating upper and lower layers together to form a hermetic seal in the dough surrounding the filler 33. Cutter 35 is preferably provided with air holes 37 for pressure equalization to prevent sticking due to underpressurization, or openings 37 may be provided with low pressure air fittings to facilitate release.

Figure 5:
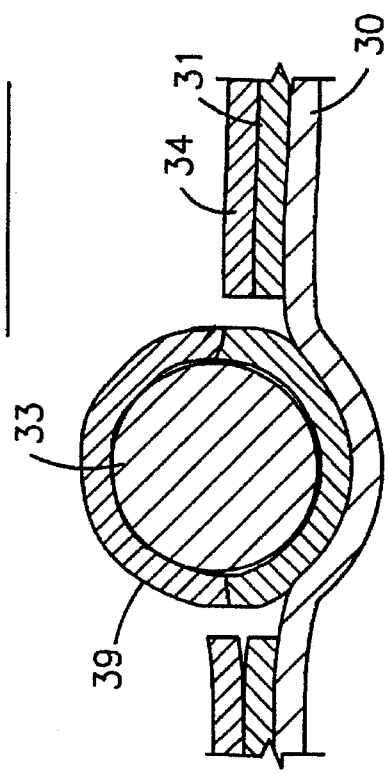
FIG. 5 shows the upper and lower hemispheres mated to form a cream cheese filled bagel dough ball.

As can be seen in FIG. 5, upon retraction of the cutter, the receptacle 30 contains a ball comprising filler 33 sealed within a bagel dough shell 39. Preferably, no air space or void remains within the bagel dough shell.

Figure 6:
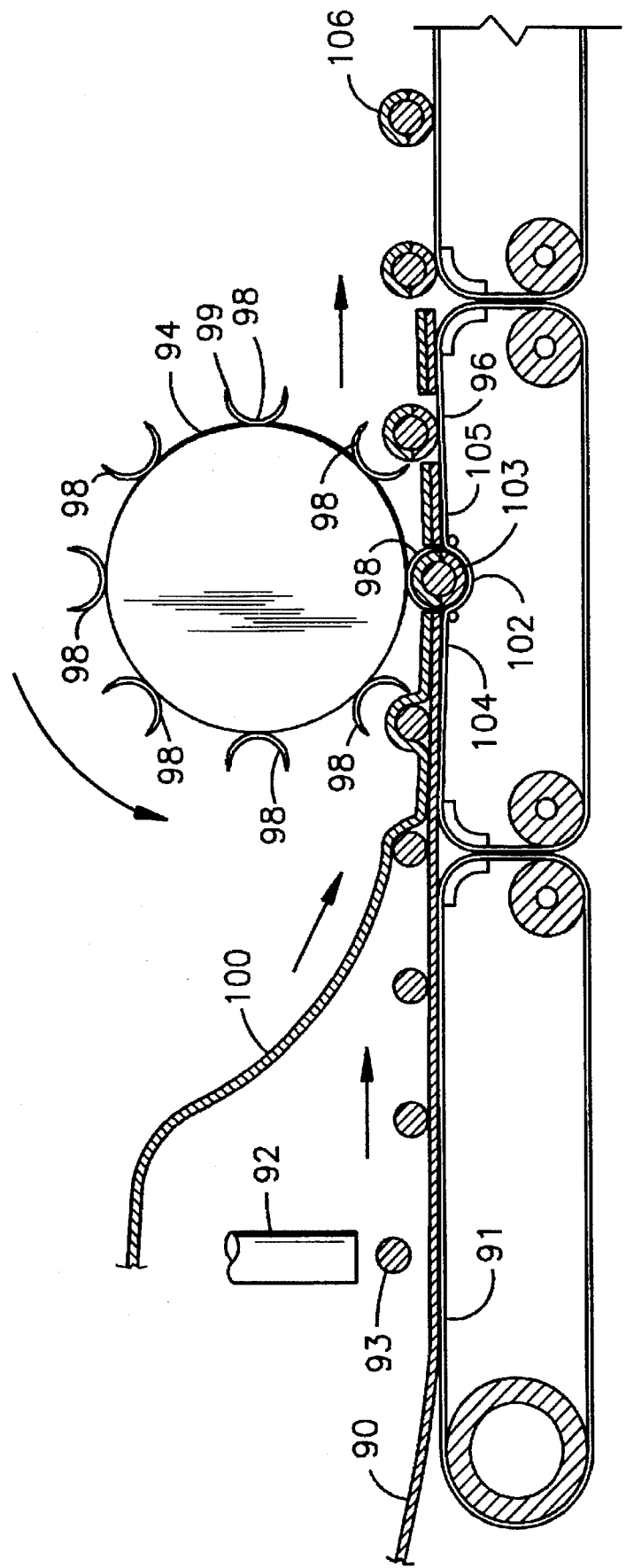
FIG. 6 schematically shows the operation of machinery for automatically producing filled bagel balls.

An automated continuous process for production of filled bagel products can easily be envisioned given the above disclosure of the batch process. For example, the bagel ball preshapes may be formed by an automated process as follows. The lower hemisphere of the bagel ball may be formed on a continuous belt in substantially the manner described above for the batch process. Alternatively, as shown in FIG. 6, a sheet of bagel dough 90 may be deposited upon a flat conveyor belt 91 of which the upper surface, as shown in FIG. 6, is conveying the bagel dough from left to right. Ejector 92 ejects quantities of cream cheese or other filler 93 onto the sheet of bagel dough, where the filler lightly adheres to the dough. The dough 90 with filler 93 attached is transported to a second conveyor belt 96. Conveyor belt 96 is characterized by being four-way stretchable, light weight, strong yet very flexible material, similar to nylon hose. The conveyor belt may be any material which permits the dough 90 and filler to bulge downward when not supported by a lower supporting surface and when urged downward as discussed in the following.

Figure 8:
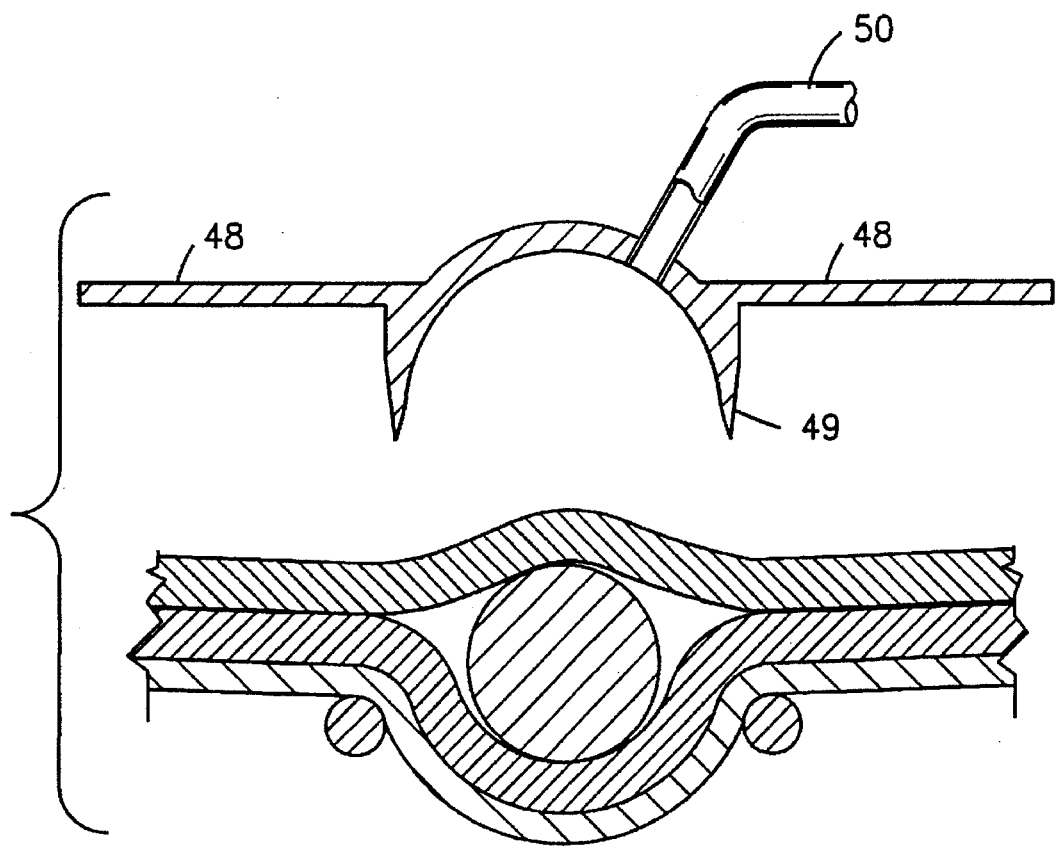
FIGS. 8 and 9 show alternative bagel ball making devices.
Figure 9:
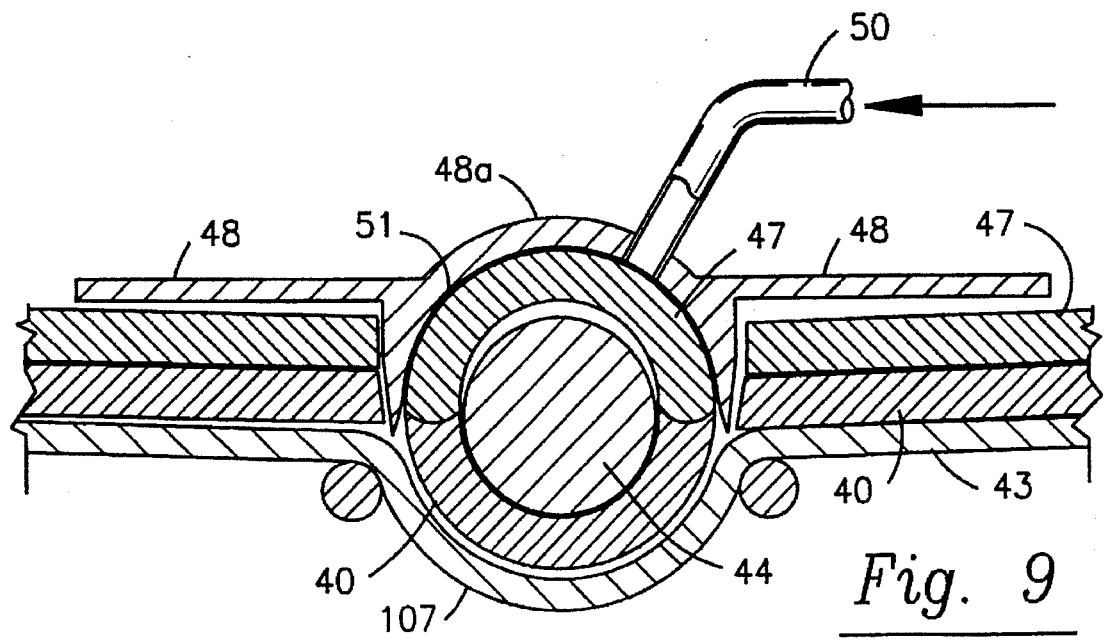

A rotating drum 94 rotates in synchrony over belt 96. Rotating drum 94 is provided with cup-like cutters 98. The cutters corresponds substantially to the pneumatic/hydraulic upper hemispherical receptacle 47 as shown in FIGS. 8 and 9, except that the cutters 98 are constructed so as to be capable of movement, via attachment to the rotating drum as shown in FIG. 6, at the same rate of speed as the conveyor belt 96. At the same time an upper sheet of relaxed dough 100 is being deposited over the filler 93 and lower layer of dough 90. At this time the filler 93 and dough 90 are traveling down a slight slope 104 on the conveyor belt. By the time the cutter 98 reaches the bottom dead center on the drum, it is simultaneously (a) pressing the upper sheet of dough down onto the filler and, in the area of the cutting edge of the cutter, pressing the upper sheet of dough 100 down onto the lower sheet of dough 90, (b) urging the filler and lower sheet of bagel dough downward into the web belt 96, which web belt is not supported at this point, forming in the web belt a bulge 102 or lower hemispherical shape underneath the filler, (c) mating the newly formed upper hemispherical dough shape to the newly formed lower hemispherical dough shape to thereby completely enclose the filler within a bagel dough shell 103, and (d) cutting or trimming unnecessary material of the sheets 90, 100 away from the now completely formed filled ball 106 with cutting edges 99.

Obviously, many variations on the lower conveyor belt are conceivable: the belt may contain a series of preformed receptacles or indentations, the belt may be formed of a loose or pleated material and an egg-cup like form 107 may be provided under the belt such that pressure from the rotating drum and cutters 98 will force the lower dough sheet 90, filler 93, upper sheet 100, as well as conveyor belt 96, into the cup like form to form the ball-shaped filled bagel dough product, etc. As the drum 94 rotates further, the formed filled bagel dough product 106 is released and conveyed to the next processing step.

Figure 7A:
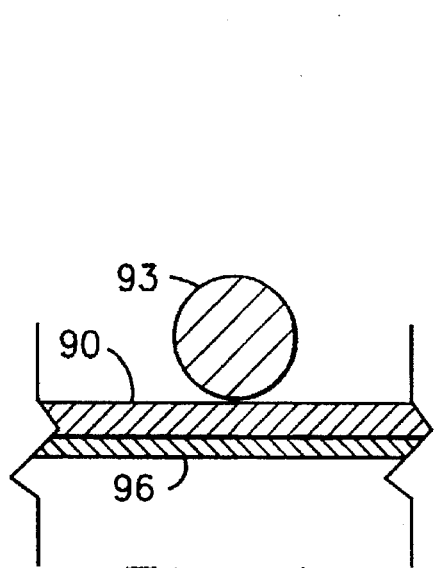
FIGS. 7a–7d are enlarged views showing steps of the bagel ball forming process according to FIG. 6.
Figure 7B:
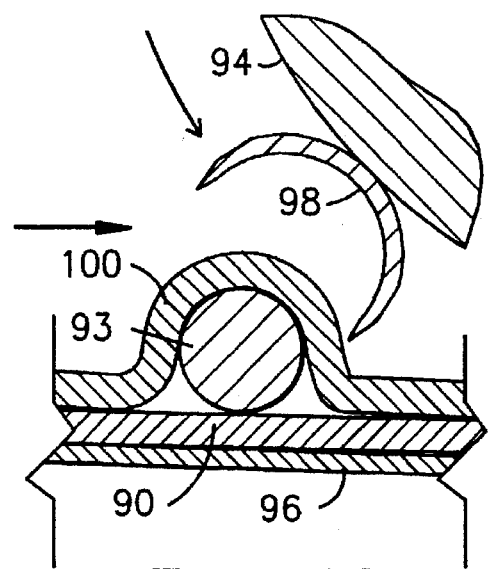
Figure 7C:
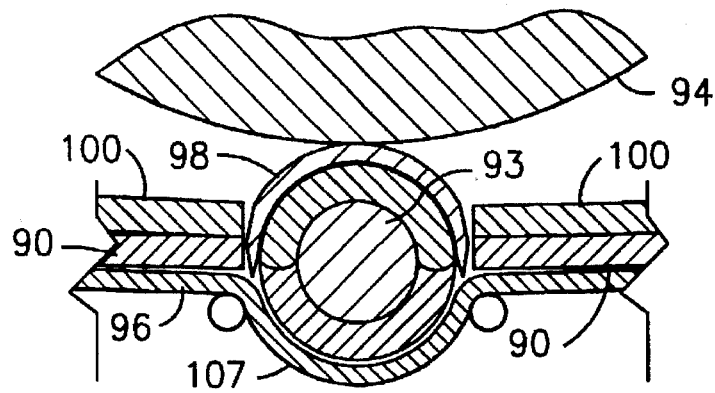
Figure 7D:
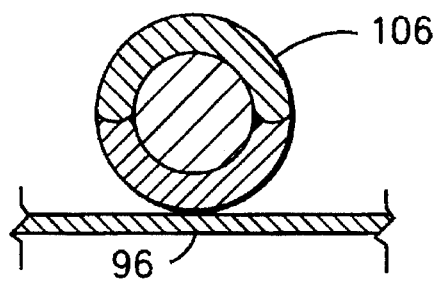

FIGS. 7a–7d correspond to FIG. 6 and show stages in enlarged detail. First, the filler is deposited on the sheet of dough (FIG. 7a). The upper sheet 100 superposed over the lower sheet and filler (FIG. 7b). Lowering of the cutter 98 presses the lower sheet 90, conveyor belt 96, upper sheet 100 and the filler 93 into a lower cup-like receptacle formed by the stretching or unfolding of the conveyor belt webbing, either with or without a cup-like mold 107 under the ball being formed in order to limit the movement and to ensure the forming of a rounder shape. To facilitate movement, the cup 107 may be made to move in synchrony with the belt. Movement may be accomplished in the same manner that cutters 98 are made to move.

While these figures show the forming of a single ball, it is obvious that, e.g., eight balls may be formed simultaneously by providing eight filler ejectors 92 arranged side-by-side, eight dough ejectors 94 arranged side by side, etc. In the case that, for example, six balls are formed simultaneously, given a cycle time of 2 seconds, it can be seen that a total of 10,800 filled bagel balls may be made hourly by a smooth and continuous process.

FIGS. 8 and 9 show a further embodiment of the upper hemisphere which can simultaneously deposit an upper hemisphere of bagel dough onto lower (uncut) sheet of dough material and cut the lower sheet while forming and laminating the upper and lower sheets together. An upper mold 48 is superposed over the lower hemisphere containing the cream cheese and loosely covered by a layer of bagel dough 47. Lowering of the upper mold causes cutting edges 49 to cut through the dough around the edges of the upper and lower concavity, and at the same time causes the dough 40 of the lower hemisphere to contact and adhere to the dough 47 of the upper hemisphere, forming a cream cheese 44 containing bagel dough sphere 51. The conveyor belt at this point is very flexible and elastic. Removing the upper mold, preferably including injecting air into the upper cavity by means of air hose 50, and ensuring the presence of tension to flatten the conveyor belt, causes the bagel ball to be free and easily collected or further transported.

Figure 11:
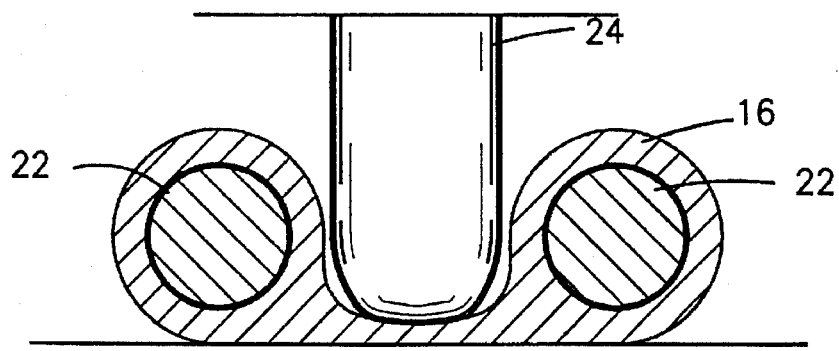
FIG. 11 shows the bagel dough ball of FIGS. 10a and 10b deformed into a semi-toroid.
Figure 12:
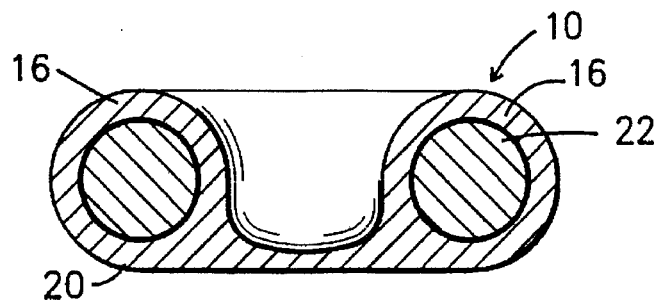
FIG. 12 is a side sectional view of the semi-toroid (or platelet) formed according to FIG. 11.
Figure 13:
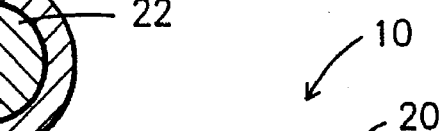
FIG. 13 is a top view of the semi-toroid of FIG. 12.

The dough ball 11 as shown in FIG. 10a is then subject to a further forming step. As shown in FIGS. 10b–13, the ball may be subject to focused pressure means such as a finger or a plunger 24 by means of which the upper shell is depressed downward towards and through the center of the dough ball 11 without, however, breaking the upper shell. In one embodiment, as shown in FIGS. 10 through 13, the plunger 24 does not pierce completely through the dough ball, and leaves a hollow depression 12 as illustrated in FIGS. 11, 12 and 13. As seen in FIG. 11, when plunger 24 stops short of piercing through the bagel ball 11 the product is a semi toroid or platelet shape, with an indentation 12 on the side where the plunger 24 was applied, as shown in FIGS. 12 and 13.

Figure 17:
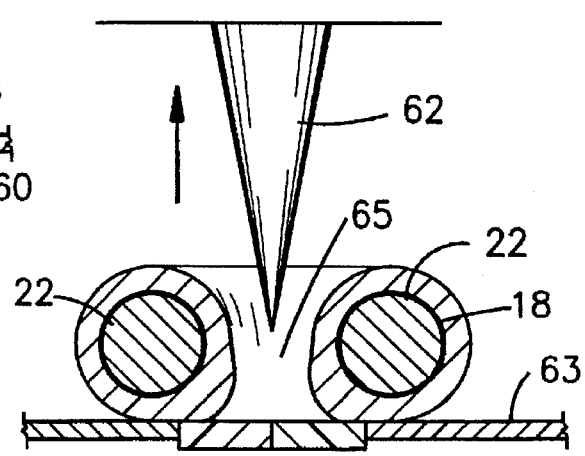

FIGS. 14 through 17 are cross-sectional views of an automated process for forming filled toroidal bagel products. Bagel balls 11 produced as discussed above are conveyed on conveyor belt 60 preferably provided with an elastic resilient area 61 formed of a material such as rubber or a latex reinforced webbing. The bagel ball is conveyed along the belt and positioned under a piercing unit 62. The piercing unit is in the shape of an inverted cone and caused to descend on the bagel ball such that the downward facing tip of the piercing unit 62 is caused to penetrate through the uppermost surface of the bagel ball 11. As the piercing unit continues to descend, the outer wall of the piercing unit carries along with it an amount of dough 64 which travels downward and contacts the dough of the bagel ball lying on the surface of the conveyor belt 60 and/or resilient area 61. The downward movement of the piercing unit 62 and entrained dough 64 displaces the cream cheese from the center of the dough ball radially outward to the outer circumferential area. As the piercing unit 62 penetrates into the resilient area 61, the resilient area prevents bagel dough from traveling any further downward. The result is an automatically formed bagel with cream cheese hermetically sealed within the dough. The piercing unit 62 is preferably urged downward until the internal diameter 65 within the torus is one half the outer diameter of the torus. Withdrawal of the piercing unit results in the release of the filled bagel as shown in FIG. 17.

It is obvious that the final location of the cream cheese in the bagel product depends upon the point at which pressure is applied to the filled pre-form and the direction of pressure.

The process for forming the shaped bagel products according to the invention may be as varied as the products themselves. The products may be in any of a variety of shapes and sizes. The product may be elongated, circular, diamond shaped, hexagonal, or even in the shape of a pretzel. The product may be anywhere from about ½ oz. to about ½ lb., and from about ½ inch in diameter to about 8 inches in diameter.

Proofing

The filled bagel product is then placed to proof within a warm cabinet or unheated oven for 25–90 minutes, preferably 45–60 minutes at approximately 80°–120° F., preferably 90°–110° F., which permits the yeast to raise the dough.

Blast Freezer

Although it is preferred that the product be fully processed prior to freezing, the proofed product 10 may be frozen at any time after proofing. The proofed and frozen filled bagel dough product may be stored in a freezer for up to one year without deterioration, or up to one month in a refrigerator without deterioration.

Figure 18:
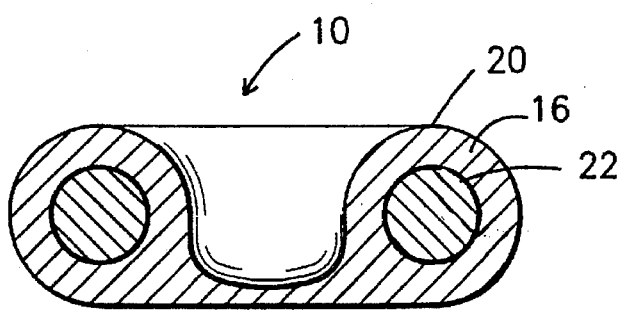
FIG. 18 is a cross-sectional view of FIG. 12, with the product being boiled.
Figure 18:
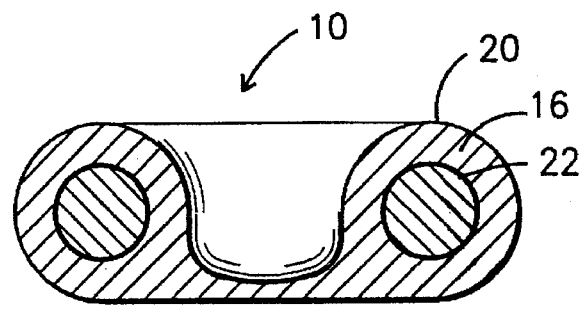
Figure 18:
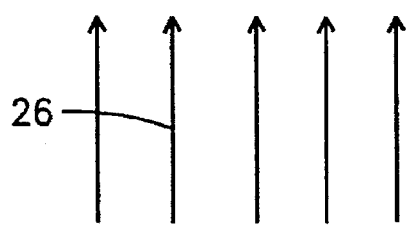

The invention makes it possible to freeze cream cheese 22, which ordinarily would curdle if frozen, or from which liquids would separate from solids during thawing, within a bagel shell and to thaw the cream cheese at the same time that the bagel shell is being further processed, i.e., boiled or baked. This is because the boiling step, as shown in FIG. 18, acts to thaw the frozen cream cheese at a rate at which separation of solids and fluids in the cream cheese 22 is prevented. The frozen cream cheese also acts to prevent water absorption by the bagel shell. Upon boiling the bagel shell, the cream cheese 22 is restored to its original texture and flavor. Thus, the product 10 not only provides a freezable, cream cheese 22 filled bagel product which, following boiling, is extremely tasty and provides the same enjoyment as conventional New York style bagels which are cut open and filled with cream cheese, the product 10 also allows the lengthening of the shelf-life of the cream cheese 22 through allowing it to be frozen. The one year period of storage far exceeds the storage capability of separately sold conventional bagels and cream cheese.

Boiling

The product is boiled for an amount of time which generally depends upon the temperature of the bagel product prior to boiling. If frozen as discussed above, the proofed product is preferably boiled for approximately 1–2 minutes, preferably about 1 minutes, to provide a wet crust. A small amount of sugar is preferably added to the water for boiling, as this sugar adds in the browning of the bagel skin. If sugar is not added, the final product after a first baking is less brown than if sugar had been added to the boiling water. This is usually not a problem where the final product is frozen after the first baking, and intended to be re-baked by the consumer or vendor prior to consumption. In that case, the second baking usually adequately browns the bagel, even if sugar is not added to the boiling water. If the proofed product is not chilled, it is boiled from 30 seconds to one minute. Preferably, the product is boiled for 30 seconds on one side, flipped over, and boiled for 30 seconds on the other side. If the product is chilled to about 35° to 40° F. prior to boiling, the boiling time may be somewhat longer than 30 seconds per side. If the dough absorbs water or becomes gooey or transparent, it has been boiled too long.

As is shown in FIG. 18, the product 10 is boiled preferably for about 30 seconds to 5 minutes to enable the simmering water 26 to set the yeast of the crust 20 sufficiently to skin the outside crust 20. The defrosted cream cheese 22 contributes to this step (or in the baking or browning step) as it provides steam within the shell which causes the inner surface of the bagel product 10 to form a skin 17.

Chilling

After boiling, the product is transferred to a fine cornmeal surface to cool. The product is preferably chilled in an environment of about 25° to 30° F. after boiling and before being placed in an oven. Chilling may take about 15 minutes, and cools the cream cheese filling enough to prevent denaturalization of the cream during baking, while effectively pasteurizing the cream cheese and giving the cream cheese freezable characteristics as discussed above.

The product 10 is chilled until the cream cheese 22 in the core of the product is about 40°–50° F. This prevents the cream cheese 22 from becoming denaturalized by the heat of the baking process, thus, keeping its texture and taste.

Egg Wash

The product 10 may be glazed or sprayed with egg wash prior to the browning step, and other products, such as poppy seeds, onion, etc., may be sprinkled onto the product to enhance the flavor and to accommodate the tastes and specific desires of individual consumers.

Toppings

At any time subsequent to proofing, and preferably after a first browning step, toppings such as cheese, tomatoes, spinach, etc. may be applied to the top of the bagel dough product. Following topping with a second mild baking step results in the topping being more firmly adhered to the bagel product, which facilitates handling, transporting, packaging, and consumption.

Impinger Conveyor Oven

The boiled and preferably chilled product may next be placed in an oven for approximately 1–10 minutes, preferably about 2 to 6 minutes, most preferably about 6 minutes at a temperature of 550° F., of browning (depending upon temperature, type oven, and size of filled product).

Figure 19:
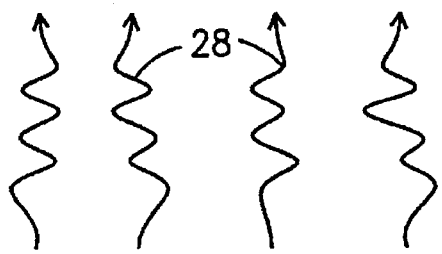
FIG. 19 is the cross-sectional view of FIG. 12, with the product receiving dry heat.
Figure 14:
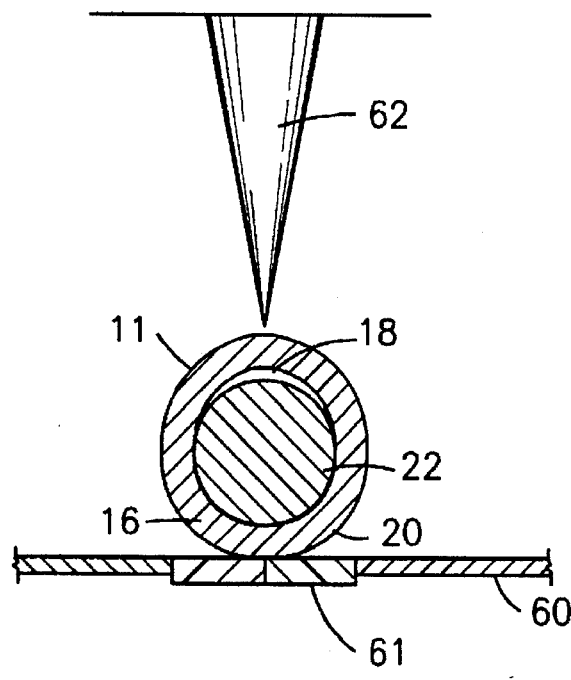
FIGS. 14 through 17 show the forming of a cream cheese filled bagel with a sharp instrument.
Figure 15:
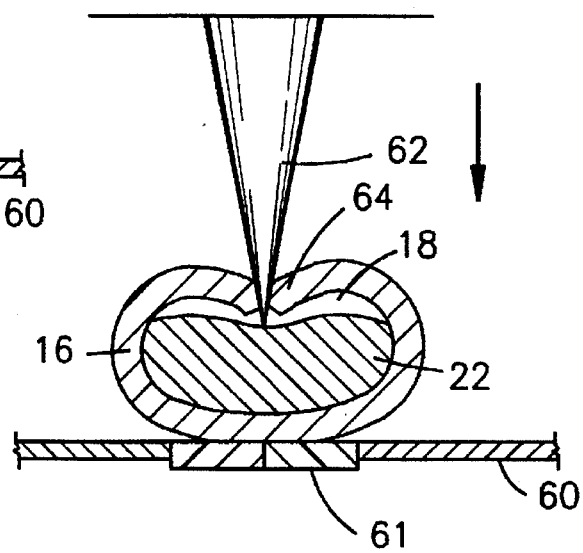
Figure 16:
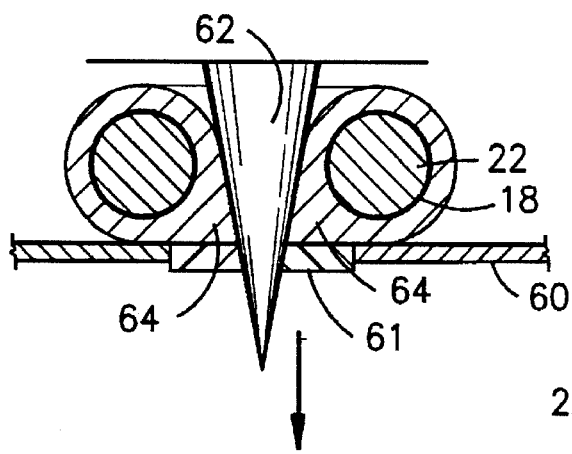

As shown in FIG. 19, the product 10 is browned through applied heat 28 in an impinger conveyor oven (similar to a commercial pizza oven) for approximately 6 minutes.

The yeast is most likely fully inactivated prior to the browning step, but any remaining active yeast may continue to ferment within the crumb 16 for a short period to reduce the size of gas cells in the annular interior of the baked product 10. The finished dough texture becomes compacted, since the crusts 16, 20 have already been set during the boiling step.

It is yet a further surprising discovery that a filled bagel product prepared in accordance with the present invention may be baked for an extended period to produce a product with a low moisture content, providing a non-traditional bagel dough product which can be stored for long periods without freezing or refrigeration. This dried product is an ideal snack food.

Blast Freezer

The boiled and/or browned product 10 may optionally be frozen, and is preferably cooled or chilled prior to freezing. The frozen product may be stored in a freezer for up to one year without deterioration, or up to one month in a refrigerator without deterioration.

Packaging

Any conventional packaging process may be used.

Consumption

The resulting product is a cream cheese-filled bagel dough product which can provide enjoyment of the distinctive New York bagel and fresh cream cheese taste, with no requirement for cutting or spreading the cheese. The process of producing the product according to the invention enables freezing the intermediate and/or final product, including the cream cheese, for extended periods with no deterioration in quality.

The product is sold to retailers or consumers in a frozen state, and is boiled and baked or browned by the retailer or consumer prior to consumption.

If refrozen after the initial baking step, the refrozen product may be microwaved in a plastic bag or baked while still frozen. The thawed or frozen product is placed in a hot oven for approximately 1–10, preferably about 2 minutes, of browning (the time varying according to the mass of the individual products). During browning, the steam given off by the cream cheese filling steams and forms a skin on the inside of the shell. The resulting product is a cream cheese-filled bagel dough product which provides enjoyment of the distinctive New York bagel and cream cheese taste, with no requirement for cutting or spreading the cheese.

The product may even be grilled in much the same way that a grilled cheese sandwich is prepared. Such a product is crunchy outside, warm and soft inside, may be low-fat, and can be sold directly to the consumer in much the same way that slices of pizza are currently being sold.

In a further embodiment, the filled balls or other shapes may be baked to the point that the bagel shell and cream cheese are dehydrated, forming a dry product which may be stored without requiring freezing. This dried product has a crunchy mouth-feel and can compete with potato chips, nachos, etc.

The product may have been baked or browned prior to being frozen and sold to the consumer, or may have been frozen without baking or with only partial baking.

In the case that the product is frozen without having been baked, the frozen or thawed composite is placed in a heated oven by the consumer, and during baking the steam given off by the filling steams and forms a skin on the inside of the shell. In the case that the product is browned or partially baked prior to freezing and selling to the consumer, the filling in the filled bagel product gives of steam during the baking process, which forms a skin in the inside wall of the bagel dough shell. This skin allows for cold storage of the composite, and for secondary baking by the consumer to further form a crust on the outside of the shell.

Thus, not only does the process provide a novel bakery product that provides both bagel and cream cheese in a conveniently packaged, prepared combination, but it enables lengthening of the cream cheese shelf-life over what would normally be available for separately sold bagels and cream cheese.

Variations

Another option is to take the filled bagel product after the chilling step, and before the baking step, and frying and then dipping the product in sugar to make a confectionery type of bagel.

The filled dough product, in addition to being filled with cream cheese, may also be filled with other traditional bagel topping, such as onions, poppy seeds, or lox. The surface may be shined or glazed, if desired, with an egg or other wash.

A. Fully Automated Production-Proofed and Frozen Product

Figure 20:
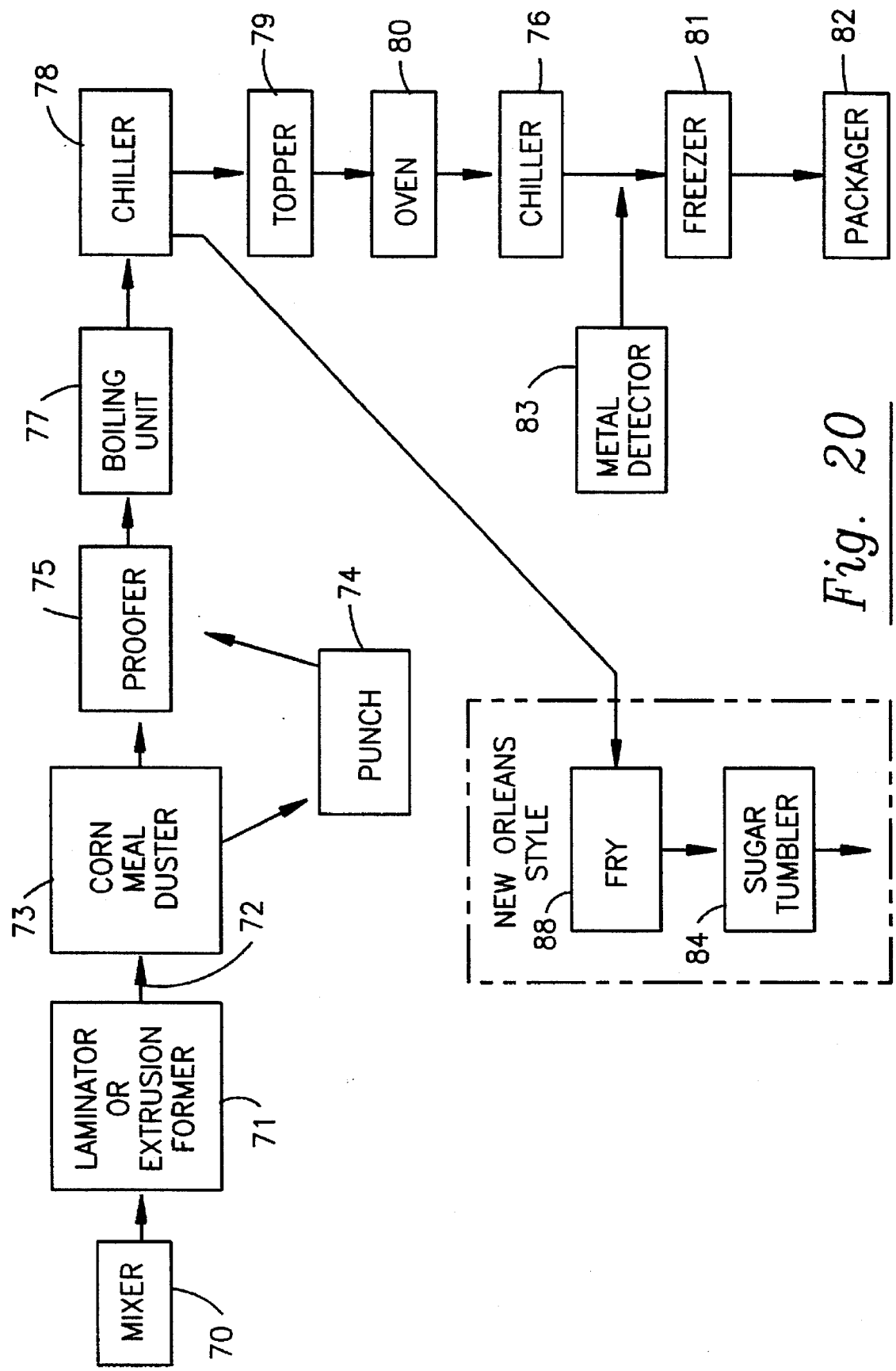
FIG. 20 is a schematic diagram showing an automated process for producing filled bagel dough products.

A schematic diagram of a fully automated process for production of filled bagel products on a commercial scale, including boiling, browning and serving or refreezing, is shown in FIG. 20. The purpose of the production line is to produce a filled bagel by a fully automatic means.

First, dough is mixed in mixer 70. (See, for reference, Kemper pamphlet spiral mixer and lifting/tilting device.) Mixed dough goes to coextruder or laminator 71 where a filling is added. (See, for reference, Rheon Model 208 pamphlet encrusting/spherical molding machine and Reiser/Vermag pamphlets on coextruders/stuffers.) From there the product in the form of filled bagel balls is transferred from a series, single (or double, if more than one extruder) column arrangement at the exit belt of the extruder, by means of a diverter 72, to a parallel, multiple column arrangement on one or multiple parallel conveyor belts. (See, for reference, the single to multiple conveyor arrangements described in the JanTec conveyor pamphlet.) The filled dough balls are then carried by conveyor through a duster 73 which applies a light corn meal coating to the bases, to prevent sticking during transit. Each time the product moves from station to station, it is transferred from one run of conveyor to another, to avoid contaminants being carried by conveyor from one station to the next.

For a filled bagel product with a filled ring or doughnut shape, the product is then subjected to a punch 74.

In one variation the bagel ball is compressed centrally after being diverted into a slotted compartment on a conveyor belt. At the same time a soft, smooth rod is caused to depress the ball at its center, without breaking the skin. This produces a filled doughnut-ring shape. Doing the punching 74 after the diverter 72 is preferred as this permits multiple bagel balls to be depressed simultaneously, while doing the punching at the exit of the extruder would only permit single line punching. The punching is similar to taking a ball, placing it on a flat surface, and pressing it in the center with a finger. After the ball is dented, it looks like a doughnut. Multiple heads the size of middle finger go into the balls to displace the filling (cream cheese) out of the center of circular cross-sections of the toroid of the created ring shapes.

In another embodiment as discussed in detail above, a piercing unit is used in the place of the punch, and the product is in the shape of a conventional (unproofed) bagel with a hole formed through the center thereof.

The product is then transferred to a proofer 75 with an internal conveyor transit time of ½–1 hr., depending on the temperature of the dough when it goes in the proofer 75. For example, at a temperature of 90°–110° F. at 85–95% humidity, the time may be 35–45 minutes. The time and temperature of proofing step may be varied widely depending upon the desired characteristics of the final product.

B. Automatic Process-Boiling, Browning and Serving or Freezing

The product to be served or to be further processed is brought into an auto doughnut machine conveyor device for boiling 77, where the product is carried into 6"–8" of shallow water at a simmer or boil, preferably just under boiling 210° F.–212° F. for 30–60 seconds, preferably 30 seconds per side. During this period, the product exterior cooks, while the chilled cream cheese begins to warm (or the frozen cream cheese is thawing), bringing the interior temperature of the dough up to 120°–180° F. Because the density of crumb is very thin and not insulative, the heat penetrates right through. For preservation of the cream cheese the product core must have a low initial temperature. After boiling, the product is then quick chilled 78 to bring it to a 35° F.–40° F. core temperature. The product is then passed through a topping station 79, where egg wash and sprinkle topping, etc., is applied through spray coils. From there, the product passes in to a conveyor oven 80 for about 3–6 minutes transit time for full baking at 500°–550° F. (For reference, consider the conveyor ovens used at the local Domino's TM pizza.) In order to avoid cross-contamination, at every station the product switches to a different conveyor. In the beginning of the process, some of corn meal adheres to the product bottom which allows it to have a slick surface. It is desirable to supply a coating that can stick.

Next, from the oven 80, the product is delivered either to the consumer or to a blast freezer 81 of $N_2$ or $CO_2$ type (preferably $CO_2$ type) where it is quick frozen. (See, for reference, the Fujitetsumo MiniSpiral Freezer pamphlet.) The product is preferably cooled or chilled 76 prior to freezing.

The frozen product is then sent to a conventional processing station 82 for automatic packaging, labeling, etc. and automated storage.

Commercial refinements include an optional metal detector 83. The purpose of the detector is to ensure that the food is in a clean state and that metal shavings and similar contamination due to wear of the equipment does not contaminate the food. A simple magnetic sensor is sufficient. Placement of the metal detector can be varied. It could be placed in the punch 74 or at the corn meal duster 73. If food product metal contamination is detected, the system shuts down.

The product may be formed by any of a variety of processes such as co-extrusion of various materials simultaneously extruding (e.g., extruding an elongated length of filled dough, then wrapping it in a ring), lamination of layers of materials deposited one on top of the other, a folding pocket technique, or those described in a wide range of patents and commercial literature, such as U.S. Pat. No. 4,794,009 and the brochure "VEMAG COEXTRUDERS" by Vemag Maschinenbau GmbH.

The above described lineup as shown can be used to produce a cream cheese filled bagel dough product which may resemble a conventional New York style bagel. For a New Orleans style browned bagel product, oven 80 is replaced by fryer 88 and sugar tumbler 84.

Lamination Process

The invention further includes a process which can be used to produce a platelet shaped filled bagel dough product, and preferably a relatively large (half pound) platelet shaped filled bagel dough product.

Figure 21:
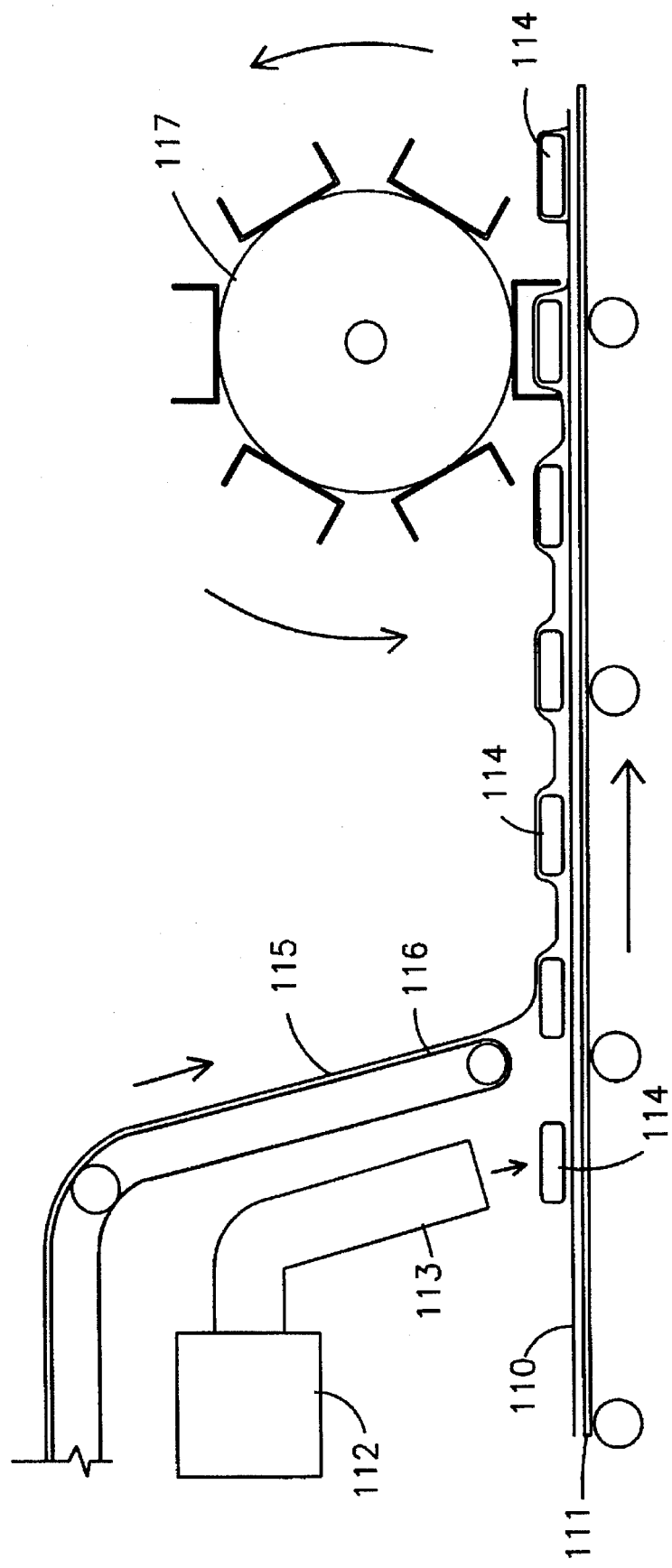
FIG. 21 is a schematic diagram showing the automated production of a cream cheese filled bagel dough product in a lamination process.

In accordance with this process, as shown in FIG. 21, a sheet of bagel dough 110 is conveyed along conveyor belt 111 in the direction from left to right as shown in FIG. 21. A quantity of cream cheese or other filler is deposited from reservoir 112 through outlet 113 onto the lower sheet of bagel dough 110, preferably in the shape of circular paddies about ¼ inch high and 5 inches in diameter. These paddies may be formed by any technique, such as wire cutting of a solidified elongate tubular 5 inch diameter cream cheese feed. As the dough advances further to the right a top sheet or layer of bagel dough 115 is conveyed by conveyor belt 116 and deposited over the lower sheet of bagel dough 110 and filler 114. A drum shaped cookie-cutter type cutting device 117 is used to cut around the perimeter of the filling, and at the same time to laminate the upper and lower sheets of bagel material to each other at the circumferential area of contact. The material around the cut out area is removed, and the cut out laminated products are further processed as discussed above. As the relatively planar shape proofs, it tends to grow upwardly rather than outwardly, so that a 6 inch diameter dough product will rise while proofing but will remain close to 6 inches in diameter.

A suitable product after proofing may be anywhere from ½ to 8 inches in diameter, and is preferably 2–6 inches in diameter and 1–3 inches in thickness. A convenient product may weigh from ½ ounce to 1 pound, preferably 3 ounces to one pound, most preferably 6 to 10 ounces.

The advantage of the lamination technique is that there is no pressure deformation of the dough shell, as in the case of beginning with a filled bagel ball and deforming the shape into a toroid or platelet. Another advantage is the ease of forming products of any desired shape, such as squares, hexagons, or decorative ornamental shapes.

This platelet shaped bagel product is preferably processed by a process which includes proofing for 45 minutes, boiling for one minute, turning at 30 second intervals, transferring to a fine cornmeal surface for cooling and optional coating with egg white and toppings, baking for about 6 minutes at 550° F. to fully cook the dough as well as browning the product, and cooling, followed by freezing and packaging or by eating.

The end product for consumption is an approximately 6 inches in diameter, approximately ½ pound novel food item which has all the desirable characteristics described above, and permits toppings to be easily applied and retained to the upper surface, and which further can serve as a snack or meal for one or more people.

In order to permanently adhere the toppings to the upper surface, it is possible to add a quick baking or melting step.

Manual Process

Any of the above products may be made completely by hand. For example, a bagel ball is formed in the manner of the parent applications. Finger pressure is used to depress and puncture the center of the ball and to make a bagel shape. The product is placed on cornmeal and proofed. The proofed article is cooled down to a core temperature of 40°–50° F., at which time the cheese is chilled. The chilled article is placed in simmering water for ½ minute, turned over and taken out after a second ½ minute. The boiled product is put into a refrigerator. The refrigerated article is partially browned and then cooled again. The cooled article is put into oven, and when removed, had the texture and taste of a traditional New York bagel, except that it is filled with cream cheese.

Although the filled bread product was described herein with great detail with respect to an embodiment comprising cream cheese filled in a bagel shell, it will be readily apparent that the combination is capable of use in a number of other applications. Although this invention has been described in its preferred form with a certain of particularity with respect to a cream cheese filled bagel dough product, it is understood that the present disclosure of the preferred form has been made only by way of example and that numerous changes in the details of structures and the composition of the combination may be resorted to without departing from the spirit and scope of the invention.

Now that the invention has been described,

I claim:

1. A process for making a filled bagel dough product; comprising the steps of:
   (a) mixing and kneading flour, water, salt and yeast to form a yeast bagel dough;
   (b) measuring an amount of a filler material, said filler material including cream cheese;

(c) forming a filled bagel dough shell by completely enclosing said amount of filler material within a shell of bagel dough produced in step (a), said bagel dough shell having an outer surface and an inner surface;

(d) pressing against said filled bagel dough shell to deform the shell into a platelet shape, with said filler material displaced radially outward without rupture of said shell;

(e) proofing the product of step (d) to activate said yeast to raise said bagel dough through fermentation;

(f) chilling the product of step (e) to a core temperature of 50° F. or below;

(g) boiling the chilled product of step (f); and (h) browning the boiled product of step (g).

2. A process as in claim 1, further comprising the steps of freezing said proofed product prior to boiling.

3. A process as in claim 1, further comprising:

chilling said proofed product to cool said filler subsequent to said boiling step and prior to said browning step.

4. A process as in claim 1, wherein said filler is a natural cream cheese.

5. A process as in claim 1, wherein said cream cheese is an artificial cream cheese.

6. A process as in claim 5, wherein said artificial cream cheese is a tofu based artificial cream cheese.

7. A process as in claim 1, wherein said dough is comprised of flour having a protein content of 13.5–14% of flour weight, a water content of 50–53%, a salt content of 1.5–2.2% of flour weight, and a yeast content of 0.5–2% of flour weight.

8. A process as in claim 1, wherein the product of step (e) is from 1 to 3 inches thick and from 2 to 6 inches in diameter.

9. A process as in claim 1, wherein the product of step (e) weighs from 3 ounces to 1 pound.

10. A process as in claim 1, wherein the product of step (e) weighs from 6 to 10 ounces.

11. A process as in claim 1, further comprising baking the product of step (g) to produce a substantially dehydrated product.

12. A process for making a filled bagel dough product; comprising the steps of:

(a) mixing and kneading flour, water, salt and yeast to form a yeast bagel dough;

(b) measuring an amount of a filler material, said filler material including cream cheese;

(c) forming a filled bagel dough shell by completely enclosing said amount of filler material within a shell of bagel dough produced in step (a), said bagel dough shell having an outer surface and an inner surface;

(d) pressing against said filled bagel dough shell with a point of a conical punch with penetration through said filled bagel dough shell and said filler material to deform the shell into a torus shape with said filler material sealed completely within said shell;

(e) proofing the product of step (d) to activate said yeast to raise said bagel dough through fermentation;

(f) chilling the product of step (e) to a core temperature of 50° F. or below;

(g) boiling the chilled product of step (e); and (h) browning the boiled product of step (g).

13. A process as in claim 12, further comprising the steps of freezing the proofed product of step (e) prior to boiling.

14. A process as in claim 12, further comprising:

chilling the proofed product of step (e) to cool said filler material between said boiling and browning steps.

15. A process as in claim 12, wherein said cream cheese is a natural cream cheese.

16. A process as in claim 12, wherein said cream cheese is an artificial cream cheese.

17. A process as in claim 16, wherein said artificial cream cheese is a tofu based artificial cream cheese.

18. A process as in claim 12, wherein said dough is comprised of flour having a protein content of 13.5–14% of flour weight, said dough has a water content of 50–53%, a salt content of 1.5–2.2% of flour weight, and a yeast content of 0.5–2% of flour weight.

19. A process as in claim 12, wherein said product of step (e) is from 1 to 3 inches thick and from 2 to 6 inches in diameter.

20. A process as in claim 12, further comprising baking the product of step (g) to produce a substantially dehydrated product.

21. A process for making a filled bagel dough product, comprising the steps of:

mixing and kneading flour, water, salt and yeast to form a yeast bagel dough;

forming a first layer from said bagel dough;

depositing a filler material comprising cream cheese on said first layer of bagel dough;

forming a second layer from said bagel dough and depositing said second layer over said first layer of bagel dough and filler material;

pressing said first and second layers together to laminate the first and second layers together in the area adjacent the deposited filler material and to seal said filler material between said first and second layers of bagel dough to form a laminated product; and proofing said laminated product to activate said yeast to raise said bagel dough through fermentation to produce a proofed product;

chilling the proofed product to a core temperature of 50° F. or below to produce a chilled product;

boiling the chilled product to produce a boiled product, and browning said boiled product.

22. A process as in claim 21, wherein said deposited filler material is in the form of a circular disk of approximately 5 inches in diameter, and wherein said second and first layers form a laminate of approximately 6 inches in diameter.

* * * * *